United States Patent

Weitzel et al.

[11] Patent Number: 6,027,672
[45] Date of Patent: Feb. 22, 2000

[54] METHOD OF PRODUCING LARGE POLYMER OPTICAL BLANKS WITH PREDICTABLE AXIL REFRACTIVE INDEX PROFILE

[75] Inventors: William H. Weitzel, Lakeside; Ugur Ortabasi, Encinitas, both of Calif.

[73] Assignee: LightPath Technologies, Inc., Albuquerque, N.Mex.

[21] Appl. No.: 09/002,065

[22] Filed: Dec. 31, 1997

[51] Int. Cl.[7] ........................................ B29D 11/00
[52] U.S. Cl. ...................... 264/1.36; 264/1.38; 264/1.7; 264/2.7
[58] Field of Search .................... 264/1.1, 1.36, 264/1.38, 1.7, 1.8, 1.9, 2.7

[56] References Cited

U.S. PATENT DOCUMENTS

| | | | |
|---|---|---|---|
| 3,423,488 | 1/1969 | Bowser | 264/2.5 |
| 3,485,556 | 12/1969 | Naujokas | 264/1.8 |
| 3,718,383 | 2/1973 | Moore | 264/1.9 |
| 3,955,015 | 5/1976 | Ohtsuka et al. | 264/1.24 |
| 4,022,855 | 5/1977 | Hamblen | 264/1.38 |
| 4,245,890 | 1/1981 | Hartman et al. | |
| 4,591,616 | 5/1986 | Miyata et al. | 525/185 |
| 4,617,350 | 10/1986 | Maeda et al. | 525/153 |
| 4,786,444 | 11/1988 | Hwang | 264/1.38 |
| 4,861,835 | 8/1989 | Maeda et al. | 252/200 |
| 5,258,144 | 11/1993 | Yean et al. | 264/1.7 |
| 5,405,556 | 4/1995 | Liu | 264/1.7 |

FOREIGN PATENT DOCUMENTS 59-71830   4/1984   Japan.
59-204519  11/1984  Japan.

OTHER PUBLICATIONS

Yasuhiro Koike et al, "Plastic axial gradient–index lens", Applied Optics, vol. 24, No. 32, pp. 4321–4325 (Dec. 15, 1985).

L.H. Sperling et al, "The Current Status of Interpenetrating Polymer Networks", Polymers for Advanced Technologies, vol. 7, pp. 197–208 (1966).

*Primary Examiner*—Mathieu D. Vargot
*Attorney, Agent, or Firm*—Benman & Collins

[57] ABSTRACT

An apparatus and process are provided for depositing a polymeric element having a gradient in index of refraction that traverses the element from one surface to an opposite surface (axially graded refractive index). Two (or more) monomers are mixed in varying proportions and spray-deposited onto a substrate to form a layer. Each layer is then exposed to light to form a polymeric layer, and another layer deposited. Where the light is UV radiation and a light-sensitive catalyst that is also sensitive to the ambient atmosphere is used, then an inert gas dispenser, which provides an inert gas over the monomer layer, may be employed in conjunction with the UV radiation. Several layers are thus spray-deposited and exposed to light, each layer comprising a different mix of the two monomers, thereby providing each layer with a different index of refraction. After the prescribed number of layers has been deposited, the polymeric element is heat-treated to cause fusion of the layers and diffusion of components, thereby smoothing out the gradient profile. The apparatus and process of the invention are also useful in producing structural gradients in polymeric elements.

12 Claims, 5 Drawing Sheets

METHOD OF PRODUCING LARGE POLYMER OPTICAL BLANKS WITH PREDICTABLE AXIL REFRACTIVE INDEX PROFILE

TECHNICAL FIELD

The present invention relates generally to materials having a graded index of refraction, more particularly, to polymers having such a gradient, and, even more particularly, to a process and apparatus for fabricating such polymers accurately.

BACKGROUND ART

Glass-based gradient refractive index (GRIN) materials, often called in the literature GRIN materials, have been studied for several years. Only in recent years, however, has this technology been brought to the market place with regard to large (e.g., at least 5 mm along the optical path), macro-gradient (e.g., $\Delta n$ greater than 0.085) lens blanks, under the trademark GRADIUM®, by LightPath Technologies (Albuquerque, N.Mex.).

Glass-based gradient refractive index materials find a wide variety of uses, including imaging lenses in optical systems, such as still and video cameras, copying machines, binoculars, microscopes, endoscopes, etc., as non-imaging lenses in concentrators, such as solar concentrators, collimators, such as laser collimators, and wavelength division multiplexing/demultiplexing applications.

The technology of the glass-based GRIN has been significantly advanced by LightPath Technologies, who developed a fusion/diffusion process to fabricate macro-size glass axial gradient lens blanks with controllable profiles of the refractive index gradient and with large $\Delta n$ (the difference in refractive index from one surface to the opposite surface of the lens).

Plastic optical materials have been developed that compete with glass in several markets, due to the advancements in technology that drives down costs, speeds up production, provides consistency, improves relative quality, and allows the manufacturer to produce more such plastic lenses in less time, and saves money in the process. The final products are in general significantly lighter and cheaper. Because of the relatively very low process temperatures, compared to glass, the polymer lenses offer considerable economies of scale in production.

One advantage that plastic lenses have over glass lenses is their light weight. The specific gravity of a typical, high quality polymer, e.g., polycarbonate, is 1.2 g/cm$^3$, whereas the specific gravity of the glass counterpart could be three to five times higher. Certain applications where such light weight would be an obvious advantage include space applications using solar photovoltaic cells with a concentrator for converting solar radiation into electricity. The electric power-to-weight ratio, i.e., watts generated per kilogram added is a significant consideration. Another application involves night vision goggles, which comprise complex infrared optics mostly made of glass, which contributes substantially to the overall weight of the headgear to which they are attached. In certain emergencies where a pilot wearing such a headgear has no time to remove it, the generated inertial forces can cause severe neck injuries to the pilot. Finally, yet another application is prescription eye glasses, where the weight is highly undesirable, because heavy glasses are uncomfortable, tend to slide down, leave heavy marks on the skin, and dislodge more quickly in the case of an abrupt acceleration or deceleration.

A significant body of literature has developed, reporting on various polymer gradient refractive index (P-GRIN) materials, including applications in (a) optical fibers for fiber networks for avionics, automotive, aerospace, and computers; (b) lens rods for light coupling, collimating, and imaging; (c) waveguides for opto-electronic integrated circuits; (d) microlenses for light coupling into single mode optical fibers; (e) macrolenses for prescription and contact lenses; and (f) optical fiber amplifiers for optical fiber lasers.

Many of the polymer gradient refractive index materials are fabricated by one of a number of reported techniques, including chemical copolymerization, gas or vapor phase diffusion copolymerization, photo-copolymerization, modified suspension polymerization, sulfonation, deposition by plasma-enhanced chemical vapor deposition, use of curved molds, interfacial gel polymerization, initiator diffusion method, and random copolymerization, for example.

However, these techniques suffer from one or more of the following disadvantages: (1) only small size optical elements, on the order of millimeters, can be produced; (2) a long time to fabricate optical elements is required; (3) only low $\Delta n$ values, on the order of 0.02, are possible; and (4) no accurate prescribable tailoring of gradient profile is possible, thereby making available only specific profiles, as in the case of liquid-phase and vapor-phase diffusion techniques for thick and large samples; see, e.g., Yasukiro Koike et al, "Plastic axial gradient-index lens", *Applied Optics*, Vol. 24 (24), pp. 4821–4325 (Dec. 15, 1985).

Thus, what is needed is a process for fabrication of polymer gradient refractive index lenses that avoids most, if not all, of the foregoing problems.

DISCLOSURE OF INVENTION

In accordance with the present invention, a method and apparatus are provided that produce polymer gradient refractive index materials of large (macro) size, in relatively short times, with improved values of $\Delta n$, and with accurately prescribable profiles that can be tailored according to the design needs. The apparatus is used to form a blank comprising a plurality of polymer layers, the blank having a prescribed profile of index of refraction that varies continuously from a first surface to a second, opposite surface.

The apparatus comprises:

(a) a base support;

(b) a substrate located above the material collection tray for supporting the plurality of polymer layers during formation thereof;

(c) a material deposition head for dispensing a layer of liquid monomer mixture on the substrate;

(d) means for causing a change of chemical/physical properties of the layer of liquid monomer mixture; and (e) means for moving the substrate relative to the material deposition head and to the means for causing a change of chemical/physical properties.

The apparatus of the invention permits the deposition of substantially uniform layers of monomer mixtures, of pre-determined mixing ratios and thickness, with specified treatment, to produce a multilayered product with selected characteristics, specifically, optical properties and performance characteristics. Planar bulk optical polymeric materials are thus produced with a prescribed gradient(s) of index of refraction, which find use in solar concentrator applications, among others. Either the substrate may be moved and the material deposition head and change-causing means held stationary or the substrate may be held stationary and the material deposition head and change-causing means moved to the substrate. While the latter is described herein as part of experimental apparatus, a manufacturing facility might prefer to use the former approach.

The process of the invention comprises:

(a) depositing a layer of a monomer mixture having a first index of refraction on a substrate;

(b) partially polymerizing the layer of monomer mixture to at least a semi-solid state;

(c) depositing another layer of monomer mixture having an index of refraction that is different than the previous layer of monomer mixture; and (d) repeating steps (b) through (c) until a prescribed number of layers of monomer mixtures, each layer having a different index of refraction, have been deposited, thereby forming the blank.

The resulting polymerized blank has a prescribed profile of index of refraction that is alterable from one blank to another simply by appropriate adjustment of the respective amounts (thicknesses) of two (or more) monomers that are mixed and sprayed onto the substrate to form mixed monomer layers; the polymerized blank comprises a plurality of the mixed monomer layers. Thus, a variety of profiles, linear, parabolic, quadratic, etc. may be formed that traverse the blank from bottom (substrate surface) to top.

BEST MODES FOR CARRYING OUT THE INVENTION

Reference is now made in detail to a specific embodiment of the present invention, which illustrates the best mode presently contemplated by the inventors for practicing the invention. Alternative embodiments are also briefly described as applicable.

The fusion/diffusion process developed by LightPath Technologies enabled the production of macro-sized (i.e., >5 millimeters) glass-based gradient refractive index materials having tailored profiles at a time when the prior art technology could only produce micro-sized (i.e., a few millimeters at most) gradient refractive index materials having Gaussian profiles. While it is tempting to import that technology for glass optical elements to plastic optical elements, such an extrapolation is not readily possible, due to the fact that vitrification (glass) and polymerization (plastic) are totally different phenomena, and these occur at temperatures very far apart from each other.

Figure 1:
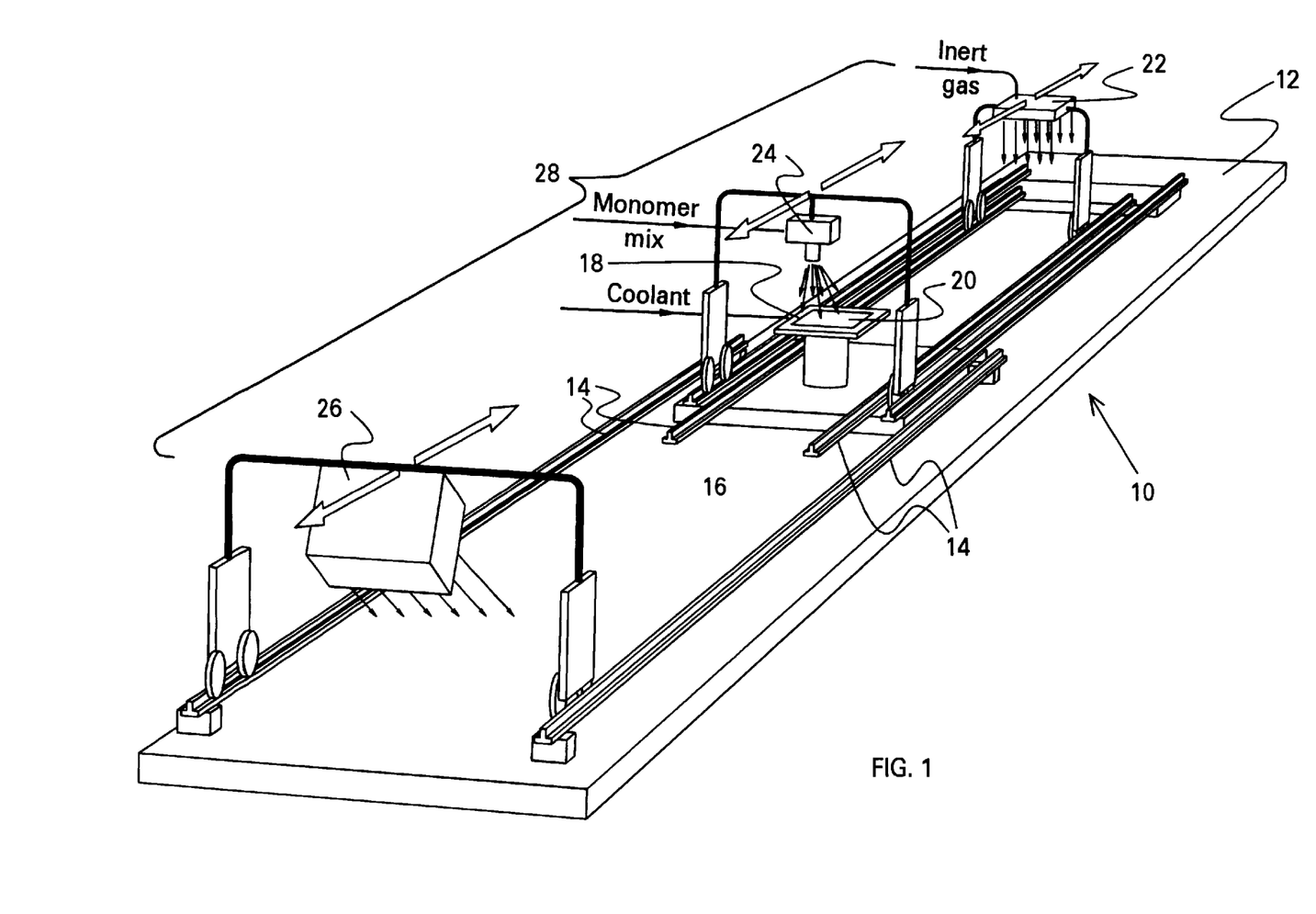
FIG. 1 depicts the mix and spray work station of the present invention.

Turning now to the figures, FIG. 1 depicts a work station 10 of the present invention. The work station 10 comprises a base support 12, on which are mounted in parallel a plurality of rails 14, which permit travel of various components, described below. The work station 10 further includes a stationary material collection tray 16, on which is mounted a support 18 for supporting a substrate 20, on which is deposited a plurality of monomer layers, as described in greater detail below. A movable material deposition head 24 also may be moved into position over the substrate 20. Finally, a movable means for causing a change in the chemical/physical properties of each deposited layer may be moved into position over the substrate 20. The sequence of movement of the various components is described below and is shown by arrows "A". The work station 10 is enclosed by an enclosure 28, only a portion of which is shown, for controlling the atmosphere surrounding the substrate 20.

The stationary material collection tray 16 is to collect any excess material that during deposition extends beyond the substrate 20. The material deposition head 24 applies each layer of monomer, and preferably comprises deposition by spraying. Other ways of depositing the monomer layers onto the substrate include flood, dip, spin, or knife blade coating methods. The means 26 for polymerizing each monomer layer preferably comprises a UV source, typically operating within the range of about 200 to 400 nm. However, a visible light source may alternatively be employed. Or, the polymerization may be effected by use of a reactive gas, such as ammonia, to cause a change in chemical composition.

In a specific embodiment, the work station 10 employs spraying as the means 24 for depositing each monomer layer and a light source 26 for causing a physical/chemical change in the properties of the deposited layers. In this specific embodiment, a movable inert gas dispenser 22 may be moved into position over the substrate 20. The inert gas dispenser 22 is employed in conjunction with the movable means 26 to prevent oxygen from inhibiting polymerization of the monomer layers. The movable spray deposition head 24 also may be moved into position over the substrate 20. Finally, the movable light source 26 also may be moved into position over the substrate 20. The sequence of movement of the various components is described below. The mix and spray work station 10 is enclosed by the enclosure 28, only a portion of which is shown, for controlling the atmosphere surrounding the substrate 20.

The polymer layers are deposited on the substrate 20 to give a flat shape with a smooth surface. In the preferred embodiment, a glass plate is used, although in principle, the layers could be deposited on just about any surface. A heat sink support 18 may be used to better control of possible heating effects from the preferred method of causing the polymer to become more resistant to mixing of layers. However, the heat sink is optional.

The substrate 20 preferably has a release characteristic with regard to the deposited material. In addition to glass, polished metal surfaces may be employed. Alternatively, it may be desired that the deposited polymer layers remain attached to the substrate 20. Further, the substrate 20 may have a predetermined shape, to which the deposited layers conform, and the final product may be part of the substrate or the product may be separated from the substrate.

The enclosure 28 permits use of a variety of environments to be employed with the various processes described herein. For example, filtered air may be employed. Alternatively, the environment may be inert, such as provided by nitrogen gas, or a vacuum or partial vacuum so as to cause deposition from the effects of vapor pressure and temperature.

Figure 2:
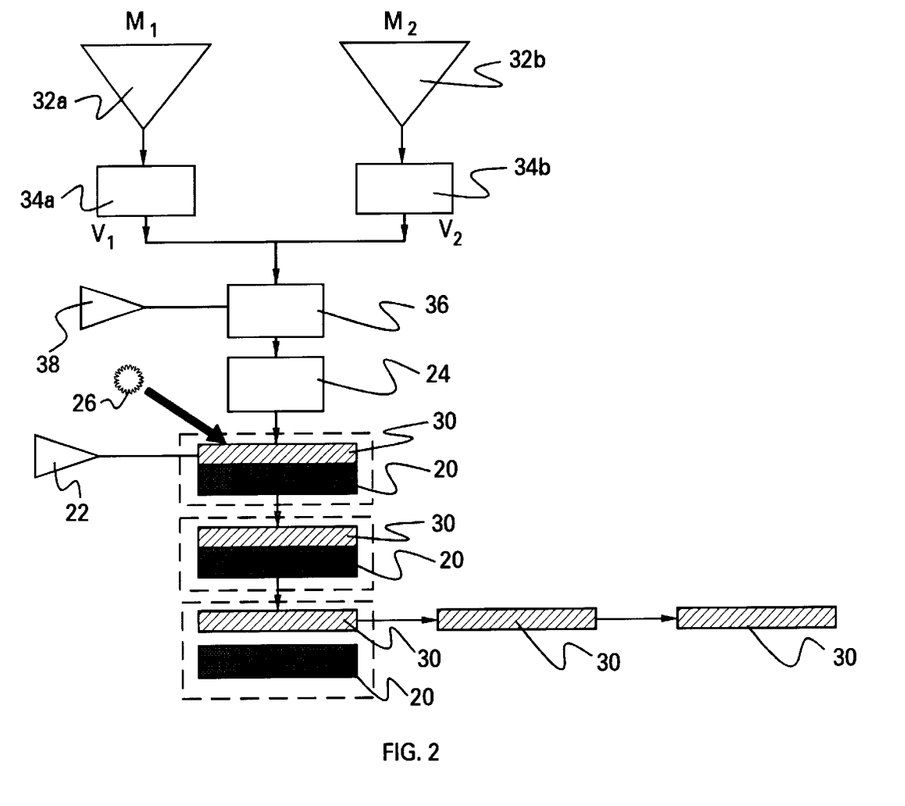
FIG. 2 depicts a detail of a portion of the mix and spray flow diagram, showing the spray head and its association to the manufacturing process of the present invention for the fabrication of polymer gradient refractive index materials.

FIG. 2 depicts additional details of the process steps as they relates to the apparatus 10. To supply the spray head 24 with a monomer mixture for forming a blank 30 comprising a plurality of layers of graded index polymer, two (or more) containers 32a, 32b are provided, each containing a monomer of different index of refraction. As an example, container 32a contains a relatively high index monomer, having an index of refraction $n_1$, and container 32b contains a relatively low index monomer, having an index of refraction $n_2$. Examples of high and low index monomers are given in Table I below. Densities ($\rho$, in g/cm$^3$) are also listed for some of the monomers.

TABLE I

Monomers and Their Index of Refraction

| GROUP | MONOMER | n | p |
|---|---|---|---|
| Methacrylate | methyl methacrylate (MMA) | 1.4990 | 1.190 |
| | ethyl methacrylate (EA) | 1.4830 | |
| | n-propyl methacrylate (nPMA) | 1.4840 | |
| | n-butyl methacrylate (nBMA) | 1.4830 | |
| | n-hexyl methacrylate (nHMA) | 1.4810 | |
| | iso-propyl methacrylate (iPMA) | 1.4730 | |
| | iso-butyl methacrylate (iBMA) | 1.4770 | |
| | t-butyl methacrylate (tBMA) | 1.4630 | |
| | cyclohexyl methacrylate (CHMA) | 1.5070 | |
| Methacrylate with high refractive index | benzyl methacrylate (BzMA) | 1.5680 | |
| | phenyl methacrylate (PhMA) | 1.5700 | |
| | 1-phenylethyl methacrylate (1PhEMA) | 1.5490 | |
| | 2-phenylethyl methacrylate (2PhEMA) | 1.5590 | |
| | furfuuryl methacrylate (FFMA) | 1.5380 | |
| Acrylate | methyl acrylate (MA) | 1.4725 | |
| | ethyl acrylate (EA) | 1.4685 | |
| | n-butyl acrylate (BA) | 1.4634 | |
| Acrylate with high refractive index | benzyl acrylate (BzA) | 1.5584 | |
| | 2-chloroethyl acrylate (2ClEA) | 1.5200 | |
| Vinyl acetate | vinyl acetate (VAc) | 1.4700 | 1.190 |
| Vinyl acetate with high refractive index | vinyl benzoate (VB) | 1.5780 | |
| | vinyl phenyl acetate (VPAc) | 1.5670 | |
| | vinyl chloroacetate (VClAc) | 1.5120 | |
| Acrylonitrile | acrylonitrile (AN) | 1.5200 | 1.175 |
| | α-methylacrylonitrile (αMAA) | 1.5200 | |
| α-substituted acrylonitrile | methyl-α-chloroacetate (MA(2Cl)) | 1.5172 | |
| | atropic acid (Matro) | 1.5600 | |
| Styrene | polystyrene | | 1.050 |
| | o-chlorostyrene (o-ClSt) | 1.6098 | |
| | p-fluorostyrene (p-FSt) | 1.5660 | |
| | o,p-difluorostyrene (o,p-FSt) | 1.4750 | |
| | p-iso-propyl styrene (p-iPSt) | 1.5540 | |

Additional monomers include tetrahydrofurfiiryl methacrylate, triethylene glycol dimethacrylate, ethylene glycol dimethacrylate, tetraethylene glycol dimethacrylate, polyethylene glycol dimethacrylate, 1,3-butylene glycol diacrylate, 1,4-butanediol diacrylate, 1,4-butanediol dimethacrylate, diethylene glycol diacrylate, diethylene glycol dimethacrylate,1,6-hexanediol diacrylate, 1,6-hexanediol dimethacrylate, iso-decyl methacrylate, neo-pentyl glycol diacrylate, neo-pentyl glycol dimethacrylate, polyethylene glycol(600) dimethacrylate, polyethylene glycol(600) diacrylate, tetraethylene glycol diacrylate, triethylene glycol diacrylate, tetrahydrofurfuryl acrylate, pentaerythritol tetraacrylate, 1,3-butylene glycol dimethacrylate, tripropylene glycol diacrylate, 2-phenoxyethyl acrylate, 2-phenoxyethyl methacrylate, polyethylene glycol(400) diacrylate, trimethylolpropane trimethacrylate, trimethylolpropane triacrylate, iso-decyl acrylate, ethoxylated(20) trimethylolpropane triacrylate, iso-bomyl methacrylate, ethoxylated(3) trimethylolpropane triacrylate, ethoxylated bisphenol-A dimethacrylate, tridecyl acrylate, propoxylated(3) trimethylolpropane triacrylate, tridecyl methacrylate, ethoxylated pentaerythritol tetraacrylate, caprolactone acrylate, ethoxylated(6) trimethylolpropane triacrylate, propoxylated(6) trimethylolpropane triacrylate, ethoxylated(9) trimethylolpropane triacrylate, ethoxylated nonyl phenol acrylate, iso-bornyl acrylate, polyethylene glycol(400) dimethacrylate, polyethylene glycol monomethacrylate, polyethylene glycol(600) diacrylate, propoxylated neo-pentyl glycol diacrylate, propoxylated glyceryl triacrylate, highly propoxylated glyceryl triacrylate, ethoxylated(15) trimethylolpropane triacrylate, and alkoxylated aliphatic diacrylate.

There are certain requirements for the selection of monomer pairs that are employed in the practice of the present invention. These include:

1. The resultant product must be transparent.
2. The monomers must evidence mutual limits of compatibility, that is, maintain mutual solubility of monomer in monomer, monomer in polymer, and polymer in polymer.
3. The monomers should have an acceptable range of use of nearly the same reaction rates for use in the UV partial cure and the final oven cure steps.

While the list of monomers in Table I and subsequent thereto represent monomers used to make polymer gradient materials, it is not known in many instances which combinations meet the above criteria. However, simple experimentation may be used to make that determination.

The monomers in the containers 32a, 32b may be partially polymerized, depending on their viscosity. Less viscous monomers should be partially polymerized, since a very fluid monomer would result in a deposited layer less thick than a monomer which is less fluid. "Pre-gelling" of the monomer is one way of controlling the fluid properties of the material being deposited. In this case, "pre-gellation" causes the material to become more viscous and allows the application/treatment of thicker layers, thus reducing the number of coating deposition layers needed to produce a product with the same final thickness. Other methods of increasing the viscosity include the use of additives in the monomer. The extent of "pre-gellation" is immaterial, as it is the desired thickening effect being sought, and the viscosity of the monomer will depend on the product design.

The containers 32a, 32b feed the respective monomers to precision dispensers 34a, 34b, respectively, which, in one embodiment, comprise Zenith gear pumps. The dispensers 34a, 34b comprise a means to measure and meter the monomers being deposited on the substrate.

A volume V is then metered out of each dispenser 34a, 34b to an in-line mixer 36, to which is added one or more cross-linking agents from a dispenser 38. The thoroughly mixed partially polymerized monomers and cross-linking agent(s) are then sprayed out of the spray head 24 onto the substrate 20, forming the gradient refractive index blank 30. As the volume of one container 34a is changed relative to the volume of the other container 34b, a change in gradient in the deposited monomer layers is obtained. Since the volume controls the thickness of each layer, the rate of change of the respective volumes of monomer can be used to control the profile of the gradient, from linear, to parabolic, to quadratic, to whatever profile is desired.

The spray head assembly 24 can then be moved out of the way and the inert gas dispenser 22 moved into place. The inert gas dispenser 22 is intended to be used in conjunction with the UV source 26. Since some materials have polymerization inhibited by the presence of oxygen, then an inert gas, such as nitrogen, may be used to remove the presence of oxygen to the reaction being caused by the action of the UV light on the contained UV-sensitive catalyst in the polymer. The means to cause a change in the chemical/physical properties of each deposited layer, here, the combination of the UV light source 26 and the inert gas dispenser 22, is used to the extent such that the deposited layer becomes inhibited from full mixing of subsequent layers being deposited.

The light source 26 is also moved into place over the blank 30. Light is then directed onto the blank 30 to partially cure a layer of monomer. The light may be pulsed or continuous. The light, which preferably comprises UV radiation, causes a chemical/physical change in the deposited layer properties, such as to control the diffusion between layers. In one embodiment, a xenon light source is employed, which produces a broad range of wavelengths. This is of interest to activate a wide range of light-activated catalysts. UV light (200 to 400 nanometers wavelength) is commonly used to gel and cure polymers. The use of a change-in-property system, as described herein, depends upon the catalyst being used or the method used to cause the change. An example of other systems to cause the same changes includes an electron beam system. Altenatively, an iron iodide source may be used to produce visible light. The mode of use—continuous or pulsed—of the source does not matter, and the time of its exposure will depend upon the nature of the material being treated.

Each layer of monomer mixture, after deposition onto the preceding layer, is so exposed to the light source 26, which serves to increase the viscosity of the layer and convert the deposited liquid to a solid, or at least a partial solid, so as to reduce the likelihood of uncontrolled mixing with the next coated polymer layer. This process may be repeated any number of times to build up a blank 30 having a prescribed index of refraction profile across a certain thickness.

Once the total number of polymer layers has been formed on the substrate 20, the substrate with blank 30 thereon is oven-cured for a period of time. The time and temperature of the oven cure will depend upon the nature of the layered material. However, typically, the curing is carried out at a temperature of about 30° to 70° for a period of time within the range of about 40 to 60 hours.

The purpose of the treatment with the light source 26 is to provide an unfinished product in a semi-stable manner. The use of the oven and curing cycle is to complete the cure to a stable product of low chemical reactivity. The preferred method described herein uses a two-catalyst system: one catalyst is light-sensitive, which is used to gel each layer upon exposure to the light source 26 and avoid excessive mixing of the deposited layers, while the other catalyst is heat-sensitive, which provides final curing in the heated oven cycle. Examples of suitable light-sensitive (UV) catalysts include benzil dimethyl ketal, trimethylbenzophenone, α-hydroxy ketone, and benzophenone. Examples of suitable heat-sensitive catalysts include benzoyl peroxide, di-isopropyl peroxydicarbonate, di-sec-butyl peroxydicarbonate, t-butylperoxy pivalate, caprylyl peroxide, lauroyl peroxide, acetyl peroxide, t-butyl peroxyisobutyrate, p-chlorobenzoyl peroxide, hydroxyheptyl peroxide, di-t-butyl diperphthalate, t-butyl peracetate, t-butylperoxy isopropyl carbonate, t-butyl perbenzoate, dicumyl peroxide, t-butyl hydroperoxide, methyl ethyl ketone peroxide, di-t-butyl peroxide, p-menthane hydroperoxide, pinane hydroperoxide, cumene hydroperoxide, 2,5-dimethyl-2,5-dihydroperoxide, and t-butyl hydroperoxide-90. Other examples of thermal catalysts (for polymerization of epoxy systems) include amines and amine adducts well-known in the art for curing monomers containing epoxy groups, used to produce oligomers containing epoxy and carbon double bonds.

The criticality of the heating and cooling rates are such as to not cause uncontrolled polymerization or the product to crack in the curing cycle, and these rates and temperatures depend on the particular monomers being used. For example, if a silicon solution or sol were used with a thickening agent and ammonia gas was used to gel each deposited layer, then the cure cycle would be: a soak at a low temperature below 100° C. to evaporate the water, then slowly heating to a temperature within the range of about 250° to 350° C. to burn out the organic additive, then a final heating in vacuum to sintering temperature to produce a solid/dense product.

It is desirable to produce a given material gradient by the deposition of layers. If the final gradient is to be in the form of distinct layers, then the action taken would be to cause more cure of each deposited layer. On the other hand, if the desired material gradient is to be continuous (without the detection of distinct layers), then diffusion between layers would be desired. The effect of diffusion between layers may be from actual diffusion between layers occurring in the oven cure cycle or from some local mixing of each deposited layer.

The specific conditions of fabrication depend on the monomers/polymers employed in the practice of the invention. A typical range of conditions would be:

Formulation:

Monomer I+0.5 parts by weight of benzoyl peroxide (thermal catalyst) +1.0 to 12 parts by weight of benzil dimethyl ketal (UV catalyst)

Monomer II+0.5 parts by weight of benzoyl peroxide (thermal catalyst) +1.0 to 12 parts by weight of benzil dimethyl ketal (UV catalyst).

Spray Deposition Rate:

To cause a deposition thickness of 5 to 200 $\mu$m per application layer.

UV Cure Condition (Inerted with Nitrogen Gas Blanket):

Pulsed xenon light source (RC 600, Xenon Corp.), placed four inches above the sample surface, reading an average UV intensity of 4 to 8 milliwatts per square centimeter on an instrument measuring UV at 365 nanometers, and moving relative to the sample surface at a rate in the range of 0.02 to 4.0 inches per second.

Oven Cure Conditions:

Suitable oven cure cycles (in a nitrogen-purged oven) include:

1. Linear heating rate from 30° C. to 50° C. in 60 hours, then 2 hours at 100° or 120° C.

2. Linear heating rate from 30° C. to 70° C. in 60 hours, then 2 hours at 100° or 120° C.

Following oven cure, the blank 30 may removed from the substrate 20. If removed, the substrate 20 is recycled to have another blank 30 formed thereon, while the original blank is optically polished and then inspected, tested, and evaluated. The finished blank 30 is then suitable for forming lenses for such applications as described above.

Briefly, the process of the present invention includes the following steps:

1. Determine the monomer compatibility (if not already known), the thermal catalyst type and concentration, and the UV catalyst and concentration;

2. Determine/measure the monomer formulation densities at delivery conditions. Measure the densities of each final cured monomer and the index of refraction.

3. Perform calculations relating the desired refractive index of each deposited layer and layer thickness (for the final product).

4. Set up the mix and spray device 24, metered flow rates, and the speed of the spray head for the range of thickness desired.

5. Determine the range required for UV exposure in regard to the material mixtures (the speed of the UV source 26 over the sample surface).

6. Enter the information from Steps 3, 4, and 5 above into the computer control interface programming to generate the machine command sequences.

7. Place the sample support 20 (glass plate) onto the sample holder 18 and start the computer control sequence of mix, spray, cure.

8. After the layers have been deposited, remove the sample holder 18 containing the deposited sample on the glass plate 20 and place it in the cure oven (nitrogen atmosphere) for curing and post-cure.

9. Remove the sample holder/sample from the oven at the end of the cure cycle and separate the polymer GRIN layer from the glass 20.

Control of the refractive index is given by the Lorentz-Lorenz relationship:

$$\frac{(n^2 - 1)}{(n^2 + 2)} * V = \frac{(n_1^2 - 1)}{(n_1^2 + 2)} * V_1 + \frac{(n_2^2 - 1)}{(n_2^2 + 2)} * V_2$$

where n is the refractive index, V is the volume fraction of the solid material, and the subscripts 1 and 2 refer to two different materials.

A list of monomers and their index of refraction (n) suitably employed in the practice of the present invention is set forth in Table I above.

A pair of monomers is selected, with deposition of the first layer starting with pure monomer 1 and with deposition of succeeding layers involving a selected sequence of increasing amounts of monomer 2 and decreasing amounts of monomer 1, until the last layer, which is pure monomer 2, is deposited. The selection of monomer pairs requires that the combination (1) produce a gradient in refractive index and (2) be mutually miscible and produce a clear/water-like (transparent) hard product, much like poly(methyl methacrylate) (Plexiglas).

Examples of suitable monomer pairs include:

(1) methyl methacrylate (MMA) and acrylonitrile (AN);

(2) MMA and vinyl benzoate (VB); and (2) allyl carbonate (CR-39) and allyl methacrylate (AMA).

The foregoing pairs of monomers have been shown to work together to form an axial gradient index of refraction.

Figure 3A:
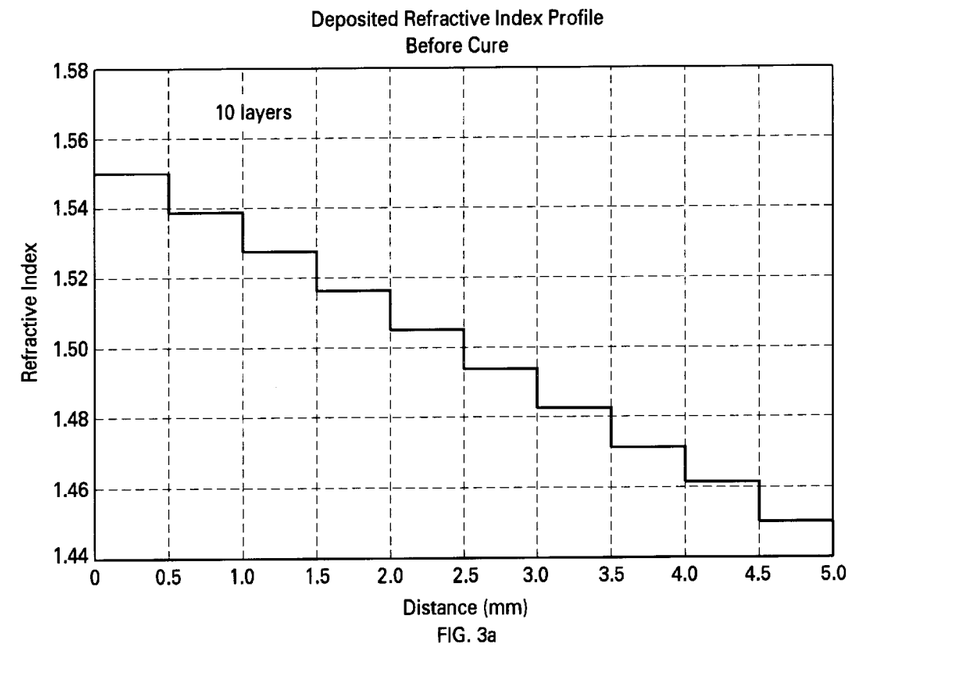
FIGS. 3a–3c, on coordinates of refractive index and thickness (in mm), are plots of the deposited refractive index profile for 10 layers (FIG. 3a), 100 layers (FIG. 3b), and 400 layers (FIG. 3c).
Figure 3B:
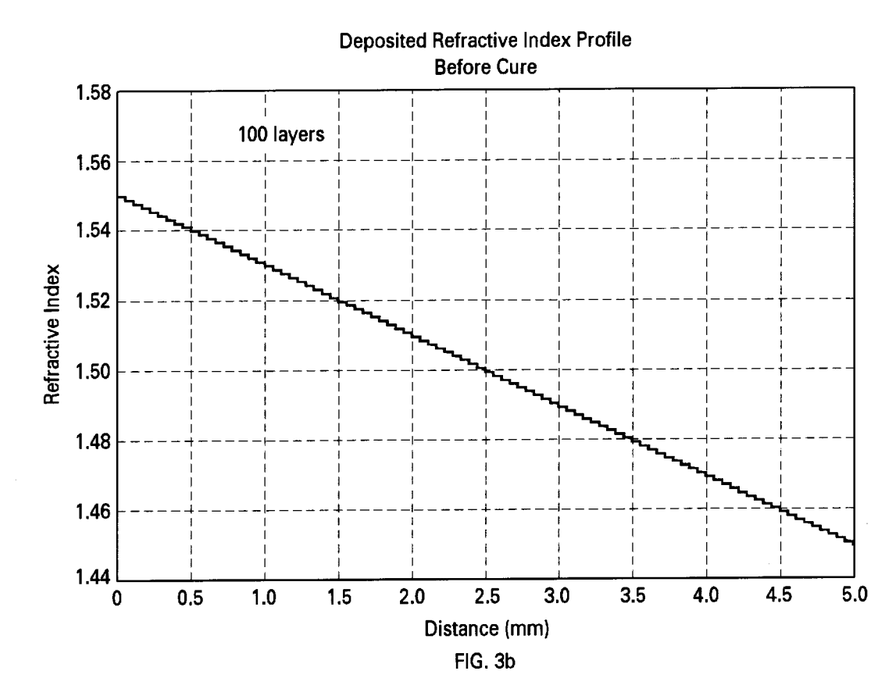
Figure 3C:
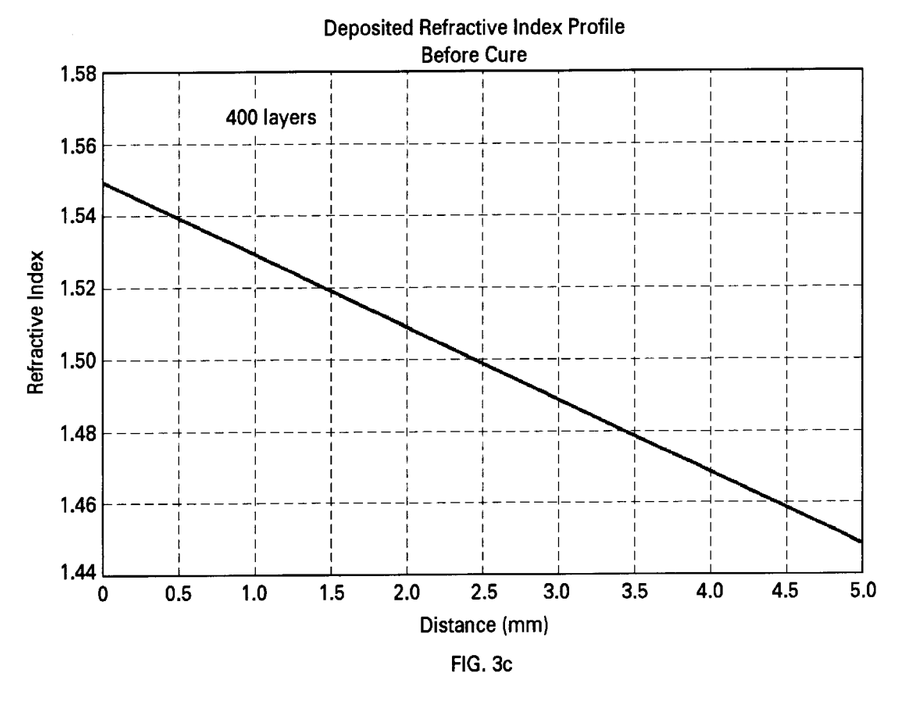

FIGS. 3a–3c, on coordinates of refractive index and thickness (in mm), are plots of the deposited refractive index profile for a blank having 10 layers (FIG. 3a), for a blank having 100 layers (FIG. 3b), and for a blank having 400 layers (FIG. 3c). The profile is seen to traverse the blank from bottom (substrate surface, distance=0 mm) to the top surface.

EXAMPLES

From the manufacturing standpoint, it is more desirable to use monomers that have been partially reacted (thermally), by heating with the contained thermal catalyst, called pre-reaction or "pre-gelling", to produce materials having a faster UV cure response, in order to thicken each layer such as not to cause excessive mixing of each layer. However, this limits the selection of material pairs because of problems resulting from some materials being more prone to immiscibility, which produces opaque films. The UV response to produce gelled layers using pre-gelled monomers is typically two to five times faster than when using non-pre-gelled monomers. (Pre-reaction would typically react to cause polymerization to produce materials having fluid viscosity values of 10 to 200 centipoises.)

The examples shown below employ two different monomers to provide a difference in the refractive index Δn for the final polymeric product. The materials are used as "monomers". The SR399 compound (dipentaerythritol pentacrylate) may be omitted; however, the UV exposure time to produce the described "gel state" to prevent subsequent layer mixing would require about twice the exposure conditions as listed. The SR399 component is added to slightly increase the fluid viscosity from about 1 cp to the value indicated and is used to decrease the UV exposure requirements of each coating layer. Each layer has a thickness of about 5 to 200 μm, and the total thickness of the finished polymeric element is about 5 mm.

Example 1

Monomer I: 85 parts by weight of styrene+15 wt. % dipentaerythritol pentacrylate (SR399—Sartomer Company)+0.5 parts by weight of benzoyl peroxide (thermal catalyst)+6.0 parts by weight of benzil dimethyl ketal (UV catalyst) (KB 1—Sartomer Company).

Monomer II: 85 parts by weight of glycidyl methacrylate (SR379—Sartomer Company)+15 parts by weight of dipentaerythritol pentacrylate (SR399—Sartomer Company)+0.5 parts by weight of benzoyl peroxide (thermal catalyst)+6.0 parts by weight of benzil dimethyl ketal (UV catalyst) (KB1—Sartomer Company).

Example 2

Monomer I: 85 parts by weight of styrene+15 parts by weight of dipentaerythritol pentacrylate (SR399-Sartomer Company)+0.5 parts by weight of benzoyl peroxide (thermal catalyst)+6.0 parts by weight of benzil dimethyl ketal (UV catalyst) (KB1—Sartomer Company).

Monomer II: 100 parts by weight of tripropylene glycol diacrylate (SR306—Sartomer Company)+0.5 parts by weight of benzoyl peroxide (thermal catalyst)+6.0 parts by weight of benzil dimethyl ketal (UV catalyst) (KB1—Sartomer Company).

Example 3

Monomer I: 85 parts by weight of styrene+15 parts by weight of dipentaerythritol pentacrylate (SR399—Sartomer Company)+0.5 parts by weight of benzoyl peroxide (thermal catalyst)+6.0 parts by weight of benzil dimethyl ketal (UV catalyst) (KB1—Sartomer Company).

Monomer II: 90 parts by weight of propoxylated neopentyl glycol diacrylate (SR9003—Sartomer Company)+10 parts by weight of dipentaerythritol pentacrylate (SR399—Sartomer Company)+0.5 parts by weight of benzoyl peroxide (thermal catalyst)+6.0 parts by weight of benzil dimethyl ketal (UV catalyst) (KB1—Sartomer Company).

The Monomers have the index of refraction n and the viscosity as listed in Table II below. The calculated change in index of refraction Δn of the resulting polymer (based on the monomer values) is also listed. UV exposure is based on a UV source, model RC600 from Xenon Company, vertical directed 4 inches above the sample, where the UV intensity averaged at 365 nm is about 4 milliwatts per square centimeter. The UV exposure speed (linear exposure rate across the substrate) is in the range of 0.05 to 0.10 inches per second. Nitrogen gas is flowed over the samples during UV exposure at a flow rate in excess of 70 standard cubic feet per hour.

TABLE II

Results of Examples 1–3.

| | Monomer I | | Monomer II | | |
|---|---|---|---|---|---|
| Example | n | Viscosity, cp | n | Viscosity, cp | Δn |
| 1 | 1.5361 | 14 | 1.4532 | 17 | 0.0829 |
| 2 | 1.5361 | 4 | 1.4485 | 15 | 0.0896 |
| 3 | 1.5361 | 4 | 1.4506 | 30 | 0.0855 |

INDUSTRIAL APPLICABILITY

The apparatus and process of the invention for forming a polymer gradient refractice index element are expected to find use in a variety of applications employing plastic optical elements having an index of refraction gradient. Further, the apparatus and the process of the invention may be used for synthesizing polymers with a gradient in their structural properties, as disclosed, for example, by L.H. Sperling et al, "The Currrent Status of Interpenetrating Polymer Networks", *Polymers for Advanced Technologies*, Vol. 7, pp. 197–208 (1966).

Thus, there has been disclosed an apparatus and a process for fabricating a blank comprising a plurality of polymer layers, each having a different index of refraction, the blank having a prescribed profile of index of refraction that varies continuously from a first surface to a second, opposite surface. It will be appreciated by those skilled in the art that various changes and modifications of an obvious nature may be made, and all such changes and modifications are considered to fall within the scope of the appended claims.

What is claimed is:

1. A process for forming a blank comprising a plurality of polymer layers, each having a different index of refraction, said blank having a prescribed axial profile of index of refraction that varies continuously from a first surface to a second, opposite surface, said process comprising:
   (a) depositing a layer of a monomer having a first index of refraction on a substrate using a deposition head which is positionable over and movable relative to said substrate and surrounding said substrate with a controlled gaseous environment;
   (b) partially polymerizing said layer of monomer to at least a semi-solid state;
   (c) depositing another layer of monomer having an index of refraction that is different than the previous layer of monomer; and
   (d) repeating steps (b) through (c) until a prescribed number of layers of monomer, each layer having a different index of refraction, have been deposited, thereby forming said blank.

2. The process of claim 1 wherein said blank is cured at an elevated temperature for a period of time.

3. The process of claim 2 wherein said blank is cured at a temperature within a range of 30° to 70° C. and for a period of time within a range of 40 to 60 hours.

4. The process of claim 2 wherein said blank is then separated from said substrate.

5. The process of claim 4 wherein said blank is then optically polished.

6. The process of claim 5 wherein said blank is then inspected, tested, and evaluated.

7. A process for forming a blank comprising a plurality of polymer layers, each having a different index of refraction, said blank having a prescribed axial profile of index of refraction that varies continuously from a first surface to a second, opposite surface, said process comprising:
   (a) depositing a layer of a monomer having a first index of refraction on a substrate using a deposition head which is positionable over and movable relative to said substrate;
   (b) surrounding said substrate with a controlled gaseous environment;
   (c) exposing said layer of monomer to a light source to polymerize said layer;
   (d) depositing another layer of monomer having an index of refraction that is different than the previous layer of monomer; and
   (e) repeating steps (b) through (d) until a prescribed number of layers of monomer, each layer having a different index of refraction, have been deposited, thereby forming said blank.

8. The process of claim 7 wherein said blank is cured at an elevated temperature for a period of time.

9. The process of claim 8 wherein said blank is cured at a temperature within a range of 30° to 70° C. and for a period of time within a range of 40 to 60 hours.

10. The process of claim 8 wherein said blank is then separated from said substrate.

11. The process of claim 10 wherein said blank is then optically polished.

12. The process of claim 11 wherein said blank is then inspected, tested, and evaluated.

* * * * *